H. G. MONKHORST.
HOLLOW HANDLE FOR SCREW DIES, PIPE CUTTERS, AND SIMILAR TOOLS.
APPLICATION FILED APR. 29, 1919.
1,323,898.
Patented Dec. 2, 1919.
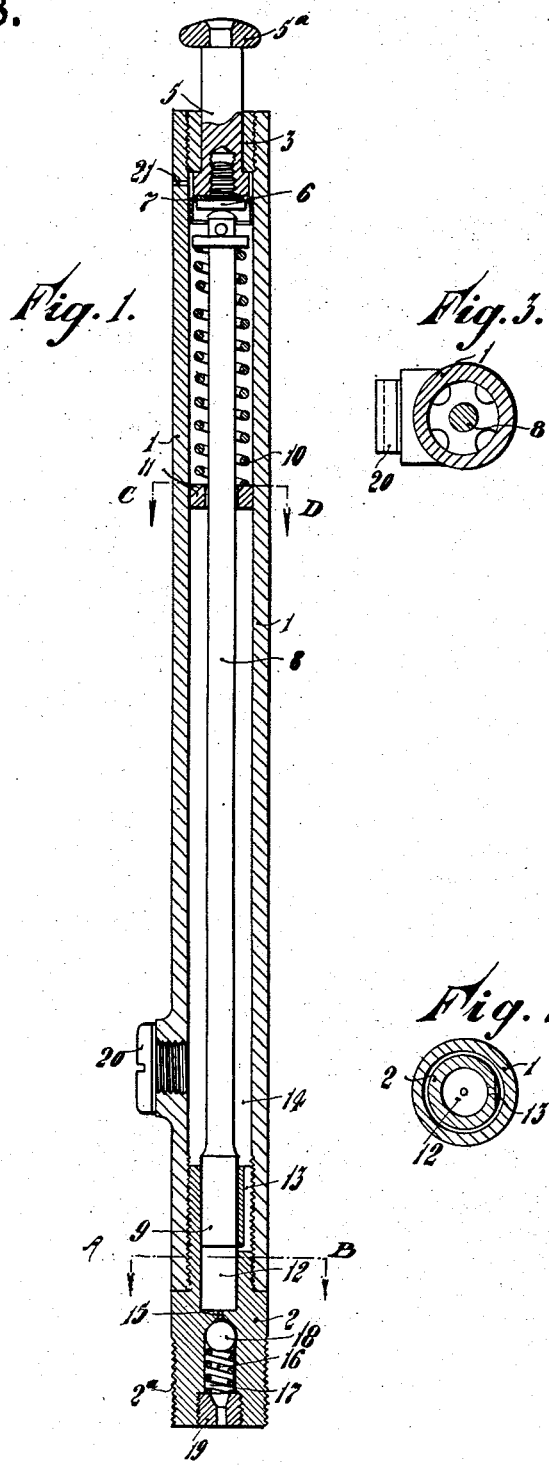
INVENTOR.
H. G. Monkhorst.

UNITED STATES PATENT OFFICE.

HERMANUS GERARDUS MONKHORST, OF DELFT, NETHERLANDS.

HOLLOW HANDLE FOR SCREW-DIES, PIPE-CUTTERS, AND SIMILAR TOOLS.

1,323,898.   Specification of Letters Patent.   Patented Dec. 2, 1919.

Application filed April 29, 1919. Serial No. 293,478.

*To all whom it may concern:*

Be it known that I, HERMANUS GERARDUS MONKHORST, a subject of the Queen of the Netherlands, and residing at Delft, Netherlands, have invented certain new and useful Improvements in Hollow Handles for Screw-Dies, Pipe-Cutters, and Similar Tools, of which the following is a specification.

This invention is for improvements in and relating to hollow handles for screw dies, pipe cutters and similar tools, of the type in which the handle is adapted to hold a certain quantity of lubricant and so arranged that the lubricant may be forced through a narrow passage to the work piece.

According to my present invention the space for storing the lubricant is in communication through a narrow-passage with a pump forming part of the handle and having a piston adapted to be actuated from outside against the action of a spring member.

In the accompanying drawing:

Figure 1 is a longitudinal sectional view of my improved handle,

Fig. 2 is a sectional view on A—B in Fig. 1, and

Fig. 3 is a sectional view on C—D in Fig. 1.

Screwed on one end of the tubular handle 1 is a mouth piece 2 having screw thread 2ª cut upon it for securing it to the chuck of the tool for which the handle is designed. The other end of the handle 1 is closed by a piece 3 having a central bore hole serving for guiding the shank 5 of a pressure knob 5ª, the said shank having secured to its inner end a piston 6 and a leather sleeve 7. Mounted inside the handle 1 is a piston rod 8 integral with a piston 9, a coiled spring 10 bearing against an internal collar 11 of the handle 1 tending to keep the rod 8 in end contact with the piston 6.

The piston 9 is adapted to reciprocate in a cylindrical chamber 12 of the mouthpiece 2, a narrow passage 13 in said mouth piece opening on one side in the hollow space 14 inclosed by the handle 1, and on the other side in the cylindrical chamber 12 just in front of the piston 9 in its highest position.

The mouth piece 2 has a second chamber 16 in communication with the cylindrical chamber 12 through a narrow passage 15 normally closed by a ball valve 18 forced on its seat by a coiled spring 17. The said spring 17 bears against a nozzle 19 having a screw connection with the mouth piece 2.

The handle 1 has a filling opening normally closed by a screw 20, and a vent 21.

Suppose the space 14 of the handle 1 to be filled with lubricant, the latter will not at first enter the cylinder 12 owing to the restricted section of passage 13. If now the knob 5ª is forced inward against the action of spring 10, the air in the cylinder 12 is compressed by the piston 9, whereby the ball valve 18 is lifted from its seat and the air allowed to escape through the nozzle 19. On the reverse motion of the piston 9 under the influence of the spring 10 a vacuum is produced in the space 12 as the ball valve 18 now keeps the passage 15 closed by the action of its spring 17. When the piston 9 has nearly reached its highest position it uncovers the opening of the passage 13 so that lubricant from the storing space 14 is permitted to flow into the cylinder 12. On the next inward stroke of the piston 9 caused by a stroke on the knob 5ª the lubricant now contained in the cylinder 12 is forced out through the nozzle 19, and so on.

It will be understood that successive strokes on the knob 5ª cause equal quantities of lubricant to be successively forced out. On each reverse stroke of the piston 6 by the operation of the spring 10 air taking its passage between the sleeve 7 and the inner wall of the handle 1 is allowed to enter the space 14, thus preventing the production of a vacuum in the said space 14 and, in consequence, any interference with the proper operation of the pump.

As a matter of course the chuck on which the handle 1 is to be screwed should be provided with a hole for allowing the jet of lubricant to be directed on the work piece.

What I claim as my invention is:

1. A handle of the character described comprising a sleeve adapted to hold a suitable quantity of lubricant, a plug in one end of the sleeve, said plug having a hollow extension formed with a port which communicates with the interior of the extension and open at its inner end, a piston in the hollow extension, a rod extending from said piston, a piston in the opposite end of the sleeve, a spring tending to hold the piston rod in end contact with the second mentioned piston, means for imparting lengthwise motion to the second mentioned piston against the action of the said spring, the plug having a passage connecting the said hollow extension and open at its outer end, and spring actuated valve which tends to hold the last said passage closed.

2. A handle of the class described, comprising a sleeve, a plug having a reduced end threaded in one end of the sleeve and provided with a cylindrical piston chamber, a valve chamber formed in the plug communicating with the piston chamber, a spring pressed valve therein normally closed, a top in the plug having a hole therein communicating with the valve chamber, a piston slidably mounted in the piston chamber, a piston rod extending therefrom and with said sleeve, the plug having a port connecting the central portion of the piston chamber with the sleeve, and means at the opposite end of the sleeve for actuating the piston.

3. A handle of the class described comprising a sleeve provided at one end with an opening and a restricted chamber, the wall of the chamber having a port which communicates with the interior thereof and the sleeve, a spring actuated valve normally closing the inner end of the opening, a piston in the chamber normally uncovering the end of the port communicating with said chamber, a spring in the sleeve to hold the piston in normal position, and means for operating the piston against the tension of the spring, whereby a definite charge of lubricant in the chamber will be expelled, the spring actuated valve being automatically closed when the piston is withdrawn, thereby creating a pull to draw another supply of lubricant into the chamber for the subsequent operation.

In testimony whereof I affix my signature.

HERMANUS GERARDUS MONKHORST.